(12) United States Patent
Wang

(10) Patent No.: US 11,947,229 B2
(45) Date of Patent: Apr. 2, 2024

(54) DISPLAY PANEL AND DISPLAY DEVICE

(71) Applicant: TCL CHINA STAR OPTOELECTRONICS TECHNOLOGY CO., LTD., Guangdong (CN)

(72) Inventor: JinJie Wang, Guangdong (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 322 days.

(21) Appl. No.: 17/429,891

(22) PCT Filed: May 31, 2021

(86) PCT No.: PCT/CN2021/097231
§ 371 (c)(1),
(2) Date: Aug. 10, 2021

(87) PCT Pub. No.: WO2022/193440
PCT Pub. Date: Sep. 22, 2022

(65) Prior Publication Data
US 2022/0299828 A1  Sep. 22, 2022

(30) Foreign Application Priority Data
Mar. 16, 2021 (CN) .......................... 202110280006.9

(51) Int. Cl.
G02F 1/1362 (2006.01)
G02F 1/1368 (2006.01)

(52) U.S. Cl.
CPC ...... *G02F 1/136286* (2013.01); *G02F 1/1368* (2013.01); *G02F 2201/52* (2013.01)

(58) Field of Classification Search
None
See application file for complete search history.

(56) References Cited

U.S. PATENT DOCUMENTS

| 2002/0158997 | A1* | 10/2002 | Fukami | G09G 3/3648 |
| | | | | 349/49 |
| 2010/0188437 | A1* | 7/2010 | Itoh | G02F 1/13624 |
| | | | | 345/87 |
| 2013/0141319 | A1* | 6/2013 | Wang | G09G 3/3648 |
| | | | | 257/E33.053 |
| 2014/0218347 | A1* | 8/2014 | Lee | G09G 3/3677 |
| | | | | 349/48 |

(Continued)

FOREIGN PATENT DOCUMENTS

| CN | 101726955 | A | 6/2010 |
| CN | 102681273 | A | 9/2012 |

(Continued)

*Primary Examiner* — Ryan Crockett
(74) *Attorney, Agent, or Firm* — PV IP PC; Wei Te Chung; Zhigang Ma

(57) ABSTRACT

A display panel is provided. A data line is divided into first and second sub data lines. Each sub-pixel meets a condition that any two adjacent sub-pixels are respectively electrically connected to the first and second sub data lines, so that connections of the two adjacent sub-pixels and the sub data lines are opposite. A display device is also provided. The display panel can solve problems of capacitance changes caused by poor alignment accuracy.

16 Claims, 2 Drawing Sheets

(56) References Cited

U.S. PATENT DOCUMENTS

| | | | | |
|---|---|---|---|---|
| 2015/0145838 A1* | 5/2015 | Xu | .................... | G09G 3/3688 |
| | | | | 345/205 |
| 2015/0145843 A1* | 5/2015 | Park | .................... | G09G 3/20 |
| | | | | 345/209 |
| 2015/0325186 A1* | 11/2015 | Wang | .................... | G09G 3/3648 |
| | | | | 345/209 |
| 2016/0197104 A1* | 7/2016 | Kim | .................... | H10K 59/351 |
| | | | | 257/347 |
| 2017/0116940 A1* | 4/2017 | Wang | .................... | G09G 3/3648 |
| 2018/0356699 A1* | 12/2018 | Hao | .................... | G02F 1/136286 |
| 2020/0098299 A1* | 3/2020 | Zeng | .................... | G09G 3/2003 |
| 2021/0116767 A1* | 4/2021 | Qian | .................... | G02F 1/136277 |

FOREIGN PATENT DOCUMENTS

| | | |
|---|---|---|
| CN | 103606360 A | 2/2014 |
| CN | 104460144 A | 3/2015 |
| CN | 105243980 A | 1/2016 |
| CN | 208521584 U | 2/2019 |
| CN | 110707139 A | 1/2020 |
| EP | 3346502 A1 | 7/2018 |
| JP | 2006301392 A | 11/2006 |

* cited by examiner

DISPLAY PANEL AND DISPLAY DEVICE

FIELD OF DISCLOSURE

The present disclosure relates to the field of display technologies, in particular to a display panel and a display device.

BACKGROUND

Thin film transistor liquid crystal displays (TFT-LCDs) are current mainstream flat panel display panels, which have advantages of light weight, small size, low power consumption, no radiation, and high display resolution. A main structure of the TFT-LCD includes an array substrate and a color filter substrate which are cell-assembled. The array substrate is formed with gate lines, data lines, and pixel structures (including thin film transistors and pixel electrodes) arranged in an array. A control signal is applied to the gate line, so a signal voltage on the data line is transmitted to the pixel electrode. A voltage is simultaneously applied to a common electrode, so that the common electrode and the pixel electrode form an electric field. An arrangement direction of liquid crystal molecules changes under an action of an external electric field, thereby controlling a light transmittance and realizing the display of different gray levels.

Pixel arrangement has many different structures, such as a normal structure and a flip structure. The normal structure means that all pixels are arranged on one side of the data line. The flip structure means that two adjacent pixels are arranged on both sides of the data line. When an exposure alignment accuracy of different layers is not good, due to the pixel arrangement, there will be local capacitance changes, such as a parasitic capacitance Cgs between a gate electrode and a source electrode, a storage capacitance Cst between the pixel electrode and the common electrode, a coupling capacitance Cpd between the pixel electrode and the data line, a parasitic capacitance Cgd between the gate line and the data line, etc., thereby affecting display performance of a panel.

SUMMARY OF DISCLOSURE

A display panel and a display device of the present disclosure can solve problems caused by capacitance changes due to poor alignment accuracy.

In order to solve the above problems, technical solutions provided by the present disclosure are as follows.

In a first aspect, the present disclosure provides a display panel, including:

a plurality of data lines, where each of the data lines includes a first sub data line and a second sub data line; and a plurality of sub-pixels arranged in an array to form a plurality of pixel columns and a plurality of pixel rows, where each of the pixel columns corresponds to one of the data lines and is disposed between the first sub data line and the second sub data line of one corresponding data line.

Any two adjacent sub-pixels are respectively electrically connected to the first sub data line and the second sub data line.

In one alternative embodiment of the present disclosure, in a same pixel column, any two adjacent sub-pixels are electrically connected to the first sub data line and the second sub data line of a same data line.

In one alternative embodiment of the present disclosure, in a same pixel row, any two adjacent sub-pixels are electrically connected to the first sub data line and the second sub data line of any two adjacent data lines.

In one alternative embodiment of the present disclosure, each of the data lines further includes a third sub data line, and the third sub data line is connected to the first sub data line and the second sub data line.

In one alternative embodiment of the present disclosure, each of the sub-pixels is one of a red sub-pixel, a green sub-pixel, or a blue sub-pixel, and the sub-pixels are arranged in an array of a red-green-blue arrangement.

In one alternative embodiment of the present disclosure, the display panel further includes a plurality of thin film transistors. Each of the sub-pixels is electrically connected to the first sub data line or the second sub data line through a source or a drain of the thin film transistor.

In one alternative embodiment of the present disclosure, the display panel further includes a plurality of scan lines. One of the scan lines is disposed on one side of one of the pixel rows, and each of the sub-pixels is electrically connected to one of the scan lines through a gate of the thin film transistor.

In one alternative embodiment of the present disclosure, the display panel further includes an array substrate, a color filter substrate, and liquid crystals formed between the array substrate and the color filter substrate.

In one alternative embodiment of the present disclosure, the array substrate includes a pixel electrode, the color filter substrate includes a common electrode, and there is a voltage difference between the pixel electrode and the common electrode to drive the liquid crystals to deflect.

In a second aspect, the present disclosure provides a display device. The display device includes the display panel as described above.

Advantages of the present disclosure are as follows. First, in the display panel of the present disclosure, one data line is divided into the first sub data line and the second sub data line. The first sub data line and the second sub data line are input with a same data signal. Thus, the first sub data line and the second sub data line of each data line only need one connection terminal to be connected to a chip, which makes the structure simple. Second, the sub-pixels meet the condition that any two adjacent sub-pixels are electrically connected to the first sub data line and the second sub data line, respectively, so that connections of the two adjacent sub-pixels and the sub data lines are opposite. When an alignment with the source and the drain of the thin film transistor of the display panel is offset, a capacitance of the sub-pixel at an alignment position changes. Moreover, a capacitance of the sub-pixel adjacent to the sub-pixel at the alignment position changes oppositely. Therefore, the capacitance of the sub-pixel at the alignment position is complementary to the capacitance of the adjacent sub-pixel, thereby solving the problem of capacitance changes caused by poor alignment accuracy. The display panel will not show bright and dark lines, uneven color, etc. due to the increase or decrease of the capacitance of an entire row or an entire column, which improves the display performance of the panel and increases a fault tolerance during factory production.

BRIEF DESCRIPTION OF DRAWINGS

In order to more clearly describe technical solutions of embodiments in the present disclosure, the following will briefly introduce drawings that need to be used in the description of the embodiments. Apparently, the drawings in the following description are only some embodiments of the present disclosure. For those skilled in the art, without creative efforts, other drawings can be obtained from these drawings.

DETAILED DESCRIPTION

Figure 1:
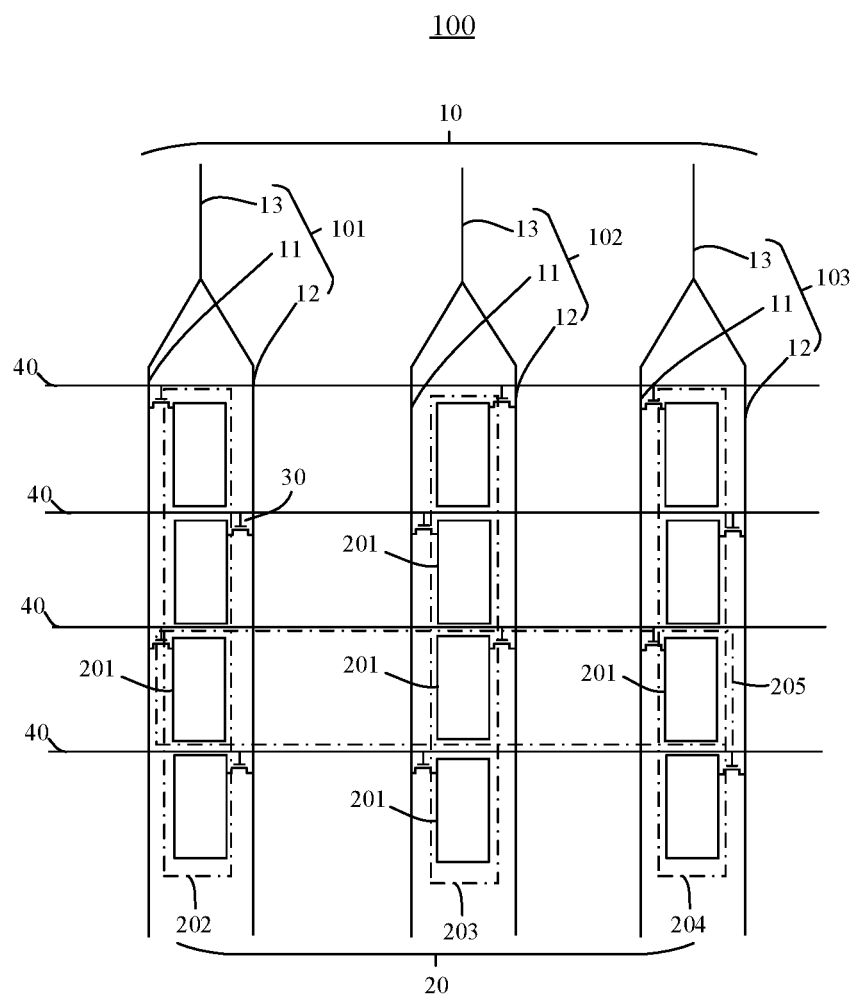
FIG. 1 is a schematic diagram of a connection between data lines and sub-pixels of a display panel of a preferred embodiment of the present disclosure.

The technical solutions in the embodiments of the present disclosure will be clearly and completely described below with reference to the drawings in the embodiments of the present disclosure. Apparently, the described embodiments are only a part of the embodiments of the present disclosure, rather than all of the embodiments. Based on the embodiments in the present disclosure, all other embodiments obtained by those skilled in the art without creative efforts shall fall within a protection scope of the present disclosure.

It should be noted that, in the description of the present disclosure, terms "above", "below" and the like indicating an orientation or position relationship are based on an orientation or position relationship shown in the drawings, which is only intended to describe the present disclosure conveniently and simplify the description, but not for indicating or implying that the specific device or elements must be arranged in a particular orientation, or be constituted or operate in a particular orientation, and therefore shall not be understood as limiting the present disclosure. Furthermore, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more, unless specified otherwise.

In addition, reference numerals may be repeated in different examples in the present disclosure. This repeating is for the purpose of simplification and clarity and does not refer to relations between different embodiments and/or settings.

The present disclosure is aimed at technical problems such as changes in capacitances (e.g., Cgs, Cst, Cpd, and Cgd) in a local area when an alignment accuracy of the existing different layers is not good, which affects display performance of a panel. One data line is divided into a first sub data line and a second sub data line. Sub-pixels meet the condition that any two adjacent sub-pixels are electrically connected to the first sub data line and the second sub data line, respectively, so that a capacitance of a sub-pixel at an alignment position is complementary to a capacitance of an adjacent sub-pixel, thereby solving the problem of capacitance changes caused by poor alignment accuracy. The display panel will not show bright and dark lines, uneven color, etc. due to the increase or decrease of the capacitance of an entire row or an entire column, which improves the display performance of the panel and increases a fault tolerance during factory production.

A display panel 100, an array substrate, and a display panel of the present disclosure will be described in detail below with reference to specific embodiments.

Referring to FIG. 1, a first embodiment of the present disclosure provides a display panel 100. The display panel 100 includes a first data line unit 10 and a first pixel unit 20.

In this embodiment, each first data line unit 10 includes three data lines (i.e., a first data line 101, a second data line 102, and a third data line 103). The second data line 102 is disposed between the first data line 101 and the third data line 103. The first data line 101, the second data line 102, and the third data line 103 all include a first sub data line 11, a second sub data line 12, and a third sub data line 13. The third sub data line 13 is connected to the first sub data line 11 and the second sub data line 12. The first sub data line 11 and the second sub data line 12 are connected to a chip (not shown) through the third sub data line.

Each first pixel unit 20 includes a plurality of first sub-pixels 201. The plurality of first sub-pixels 201 are arranged in an array and arranged to form three pixel columns (i.e., a first pixel column 202, a second pixel column 203, and a third pixel column 204) and a plurality of pixel rows 205. Each pixel column corresponds to one data line and is disposed between the first sub data line 11 and the second sub data line 12 of the corresponding data line. Specifically, the first pixel column 202 corresponds to the first data line 101 and is disposed between the first sub data line 11 and the second sub data line 12 of the first data line 101. The second pixel column 203 corresponds to the second data line 102 and is disposed between the first sub data line 11 and the second sub data line 12 of the second data line 102. The third pixel column 204 corresponds to the third data line 103 and is disposed between the first sub data line 11 and the second sub data line 12 of the third data line 103.

Any two adjacent first sub-pixels 201 are electrically connected to the corresponding first sub data line 11 and the second sub data line 12, respectively.

Specifically, in a same pixel column, any two adjacent first sub-pixels 201 are respectively electrically connected to the first sub data line 11 and the second sub data line 12 of a same data line.

Specifically, in this embodiment, in the second pixel column 203, one of the first sub-pixels 201 is electrically connected to the second sub data line 12 of the second data line 102. The other two first sub-pixels 201 adjacent to the first sub-pixel 201 are electrically connected to the first sub data line 11 of the second data line 102.

Specifically, in a same pixel row, any two adjacent first sub-pixels 201 are respectively electrically connected to the first sub data line 11 and the second sub data line 12 of any two adjacent data lines.

Specifically, in this embodiment, in a same pixel row 205, one of the first sub-pixels 201 is electrically connected to the second sub data line 12 of the second data line 102. The other two first sub-pixels 201 adjacent to the first sub-pixel 201 are electrically connected to the first sub data line 11 of the first data line 101 and the first sub data line 11 of the third data line 103, respectively.

In an alternative embodiment of the present disclosure, the first sub-pixels 201 in a same pixel column are a same type of sub-pixels, and the first sub-pixels 201 in different pixel columns of a same pixel unit are different types of sub-pixels.

In an alternative embodiment of the present disclosure, the first sub-pixels 201 include red (R) sub-pixels, green (G) sub-pixels, and blue (B) sub-pixels.

Specifically, the first sub-pixel in the first pixel column 202 is one of the red sub-pixel, the green sub-pixel, or the blue sub-pixel. The first sub-pixel in the second pixel column 203 is one of the red sub-pixel, the green sub-pixel, or the blue sub-pixel. The first sub-pixel in the third pixel column 204 is one of the red sub-pixel, the green sub-pixel, or the blue sub-pixel.

In this embodiment, the first sub-pixels in the first pixel column 202 are the red sub-pixels, the sub-pixels in the second pixel column 203 are the green sub-pixels, and the sub-pixels in the third pixel column 204 are the blue sub-pixels.

In an alternative embodiment of the present disclosure, the display panel 100 also includes a plurality of thin film transistors 30. Each of the first sub-pixels 201 is electrically connected to the first sub data line 11 or the second sub data line 12 through a source or a drain of the thin film transistor 30.

In an alternative embodiment of the present disclosure, the display panel 100 also includes a plurality of scan lines 40. One of the scan lines 40 is disposed on one side of the pixel row 205. All of the first sub-pixels 201 are electrically connected to the scan lines 40 through gates of the thin film transistors 30.

The display panel 100 further includes an array substrate (not shown), a color filter substrate (not shown), and liquid crystals (not shown) formed between the array substrate and the color filter substrate. The array substrate includes a pixel electrode. The color filter substrate includes a common electrode. There is a voltage difference between the pixel electrode and the common electrode to drive the liquid crystals to deflect.

Figure 2:
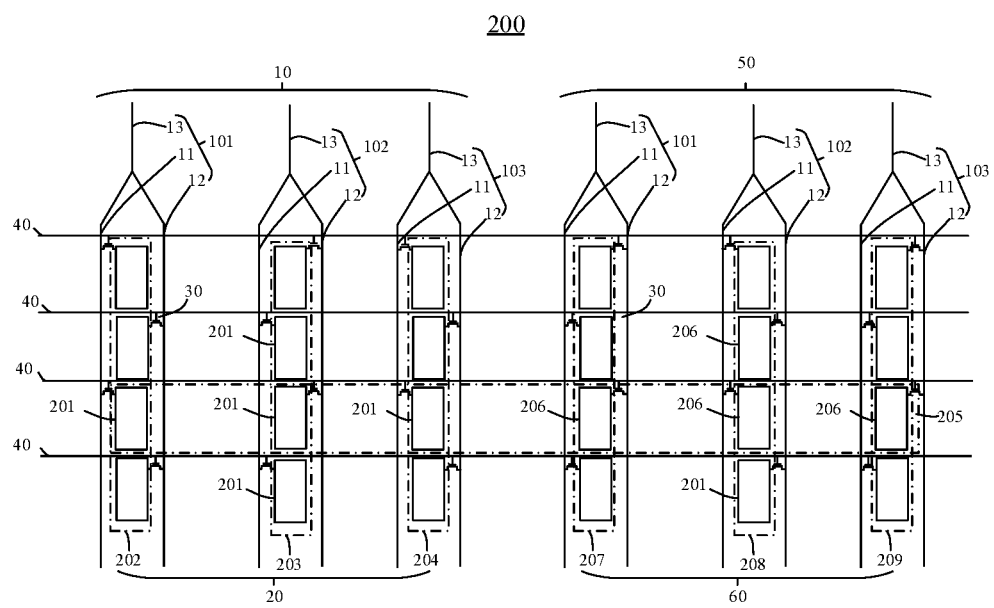
FIG. 2 is a schematic diagram of a connection between data lines and sub-pixels of a display panel of another preferred embodiment of the present disclosure.

Referring to FIG. 2, a second embodiment of the present disclosure provides a display panel 200. A structure of the display panel 200 is similar to that of the display panel 100. The difference is that the display panel 200 also includes a second data line unit 50 and a second pixel unit 60. The second data line unit 50 is adjacent to the first data line unit 10.

Specifically, a structure of the second data line unit 50 is the same as that of the first data line unit 10. That is, the second data line unit 50 includes the first data line 101, the second data line 102, and the third data line 103.

Specifically, the second pixel unit 60 includes a plurality of second sub-pixels 206. The plurality of second sub-pixel 206 are arranged in an array and arranged to form three pixel columns (i.e., a fourth pixel column 207, a fifth pixel column 208, and a sixth pixel column 209) and a plurality of pixel rows 205. One of the pixel columns corresponds to one of the data lines and is arranged between the first sub data line 11 and the second sub data line 12 of a corresponding data line. Specifically, the fourth pixel column 207 corresponds to the first data line 101 of the second data line unit 50 and is disposed between the first sub data line 11 and the second sub data line 12 of the first data line 101 of the second data line unit 50. The fifth pixel column 208 corresponds to the second data line 102 of the second data line unit 50 and is disposed between the first sub data line 11 and the second sub data line 12 of the second data line 102 of the second data line unit 50. The sixth pixel column 209 corresponds to the third data line 103 of the second data line unit 50 and is disposed between the first sub data line 11 and the second sub data line 12 of the third data line 103 of the second data line unit 50.

Any two adjacent second sub-pixels 206 are electrically connected to the first sub data line 11 and the second sub data line 12, respectively.

Specifically, in a same pixel column, any two adjacent second sub-pixels 206 are respectively electrically connected to the first sub data line 11 and the second sub data line 12 of a same data line.

Specifically, in this embodiment, in the fifth pixel column 208, one of the second sub-pixels 206 is electrically connected to the second sub data line 12 of the second data line 102 of the second data line unit 50. The other two second sub-pixels 206 adjacent to the second sub-pixel 206 are electrically connected to the first sub data line 11 of the second data line 102 of the second data line unit 50.

Specifically, in a same pixel row, any two adjacent second sub-pixels 206 are respectively electrically connected to the first sub data line 11 and the second sub data line 12 of any two adjacent data lines 12.

Specifically, in this embodiment, in a same pixel row 205 and in the second pixel unit 60, one second sub-pixel 206 is electrically connected to the second sub data line 12 of the second data line 102 of the second data line unit 50. The other two second sub-pixels 206 adjacent to the second sub-pixel 206 are electrically connected to the first sub data line 11 of the first data line 101 of the second data line unit 50 and the first sub data line 11 of the third data line 103 of the second data line unit 50.

In an alternative embodiment of the present disclosure, the first data line 101 of the second data line unit 50 is adjacent to the third data line 103 of the first data line unit 10.

In the adjacent first pixel unit 20 and the second pixel unit 60, any two adjacent first sub-pixel 201 and the second sub-pixel 206 are respectively electrically connected to the first sub data line 11 and the second sub data line 12 of any two adjacent data lines.

Specifically, in this embodiment, in a same pixel row 205, the second sub-pixel 206 of the fifth pixel column 28 of the second pixel unit 60 is electrically connected to the first sub data line 11 or the second sub data line 12 of the second data line 102 of the second data line unit 50. The first sub-pixel 201 of the second pixel column 203 of the first pixel unit 20 is electrically connected to the second sub data line 12 or the first sub data line 11 of the second data line 102 of the first data line unit 10. In a same pixel row 205, the second sub-pixel 206 of the sixth pixel column 29 of the second pixel unit 60 is electrically connected to the first sub data line 11 and the second sub data line 12 of the third data line 103 of the second data line unit 50. The first sub-pixel 201 of the third pixel column 204 of the first pixel unit 20 is electrically connected to the second sub data line 12 and the first sub data line 11 of the third data line 103 of the first data line unit 10.

The second sub-pixels 206 in a same pixel column are a same type of sub-pixels, and the second sub-pixels 206 in different pixel columns in a same pixel unit are different types of sub-pixels.

The second sub-pixels 206 include red sub-pixels, green sub-pixels, and blue sub-pixels.

Specifically, the sub-pixel in the fourth pixel column 207 is one of the red sub-pixel, the green sub-pixel, or the blue sub-pixel. The sub-pixel in the fifth pixel column 208 is one of the red sub-pixel, the green sub-pixel, or the blue sub-pixel. The sub-pixel in the sixth pixel column 209 is one of the red sub-pixel, the green sub-pixel, or the blue sub-pixel.

In this embodiment, the sub-pixels in the fourth pixel column 207 are the red sub-pixels, the sub-pixels in the fifth pixel column 208 are the green sub-pixels, and the sub-pixels in the sixth pixel column 209 are the blue sub-pixels.

Each of the second sub-pixels 206 is electrically connected to the first sub data line 11 or the second sub data line 12 through a source or a drain of the thin film transistor 30.

Each of the second sub-pixels 206 is electrically connected to the scan line 40 through a gate of the thin film transistor 30.

In other embodiments, the display panel 100 may also include more data line units and pixel units.

The present disclosure also provides a display device (not shown). The display device includes the display panel 100 or 200 as described above.

Advantages of the present disclosure are as follows. First, in the display panel of the present disclosure, one data line is divided into the first sub data line and the second sub data line. The first sub data line and the second sub data line are input with a same data signal. Thus, the first sub data line and the second sub data line of each data line only need one connection terminal to be connected to a chip, which makes the structure simple. Second, the sub-pixels meet the condition that any two adjacent sub-pixels are electrically connected to the first sub data line and the second sub data line, respectively, so that connections of the two adjacent sub-pixels and the sub data lines are opposite. When an alignment with the source and the drain of the thin film transistor of the display panel is offset, a capacitance of the sub-pixel at an alignment position changes. Moreover, a capacitance of the sub-pixel adjacent to the sub-pixel at the alignment position changes oppositely. Therefore, the capacitance of the sub-pixel at the alignment position is complementary to the capacitance of the adjacent sub-pixel, thereby solving the problem of capacitance changes caused by poor alignment accuracy. The display panel will not show bright and dark lines, uneven color, etc. due to the increase or decrease of the capacitance of an entire row or an entire column, which improves the display performance of the panel and increases a fault tolerance during factory production.

In summary, although the present disclosure has been disclosed as above in preferred embodiments, the above preferred embodiments are not intended to limit the present disclosure to those of ordinary skill in the art. Various changes and modifications can be made without departing from the spirit and scope of the present disclosure. Therefore, the protection scope of the present disclosure is subject to the scope defined by the claims.

What is claimed is:

1. A display panel, comprising:
   a plurality of data lines, wherein each of the data lines comprises a first sub data line and a second sub data line, and the first sub data line and the second sub data line are input with a same data signal; and
   a plurality of sub-pixels arranged in an array to form a plurality of pixel columns and a plurality of pixel rows, wherein each of the pixel columns corresponds to one of the data lines and is disposed between the first sub data line and the second sub data line of one corresponding data line; and
   wherein any two adjacent sub-pixels are respectively electrically connected to the first sub data line and the second sub data line;
   wherein in a same pixel row, any two adjacent sub-pixels are respectively electrically connected to the first sub data line and the second sub data line of any two adjacent data lines.

2. The display panel according to claim 1, wherein in a same pixel column, any two adjacent sub-pixels are respectively electrically connected to the first sub data line and the second sub data line of a same data line.

3. The display panel according to claim 1, wherein each of the data lines further comprises a third sub data line, and the third sub data line is connected to the first sub data line and the second sub data line.

4. The display panel according to claim 1, wherein each of the sub-pixels is one of a red sub-pixel, a green sub-pixel, or a blue sub-pixel, and the sub-pixels are arranged in an array of a red-green-blue arrangement.

5. The display panel according to claim 1, further comprising: a plurality of thin film transistors, wherein each of the sub-pixels is electrically connected to the first sub data line or the second sub data line through a source or a drain of the thin film transistors.

6. The display panel according to claim 5, further comprising: a plurality of scan lines, wherein one of the scan lines is disposed on one side of one of the pixel rows, and each of the sub-pixels is electrically connected to one of the scan lines through a gate of the thin film transistors.

7. The display panel according to claim 1, further comprising: an array substrate, a color filter substrate, and liquid crystals formed between the array substrate and the color filter substrate.

8. The display panel according to claim 7, wherein the array substrate comprises a pixel electrode, the color filter substrate comprises a common electrode, and there is a voltage difference between the pixel electrode and the common electrode to drive the liquid crystals to deflect.

9. A display device, comprising: a display panel, wherein the display panel comprises:
   a plurality of data lines, wherein each of the data lines comprises a first sub data line and a second sub data line, and the first sub data line and the second sub data line are input with a same data signal; and
   a plurality of sub-pixels arranged in an array to form a plurality of pixel columns and a plurality of pixel rows, wherein each of the pixel columns corresponds to one of the data lines and is disposed between the first sub data line and the second sub data line of one corresponding data line; and
   wherein any two adjacent sub-pixels are respectively electrically connected to the first sub data line and the second sub data line;
   wherein in a same pixel row, any two adjacent sub-pixels are respectively electrically connected to the first sub data line and the second sub data line of any two adjacent data lines.

10. The display device according to claim 9, wherein in a same pixel column, any two adjacent sub-pixels are respectively electrically connected to the first sub data line and the second sub data line of a same data line.

11. The display device according to claim 9, wherein each of the data lines further comprises a third sub data line, and the third sub data line is connected to the first sub data line and the second sub data line.

12. The display device according to claim 9, wherein each of the sub-pixels is one of a red sub-pixel, a green sub-pixel, or a blue sub-pixel, and the sub-pixels are arranged in an array of a red-green-blue arrangement.

13. The display device according to claim 9, wherein the display panel further comprises a plurality of thin film transistors, and each of the sub-pixels is electrically connected to the first sub data line or the second sub data line through a source or a drain of the thin film transistors.

14. The display device according to claim 13, wherein the display panel further comprises a plurality of scan lines, one of the scan lines is disposed on one side of one of the pixel rows, and each of the sub-pixels is electrically connected to one of the scan lines through a gate of the thin film transistors.

15. The display device according to claim 9, wherein the display panel further comprises an array substrate, a color filter substrate, and liquid crystals formed between the array substrate and the color filter substrate.

16. The display device according to claim 15, wherein the array substrate comprises a pixel electrode, the color filter substrate comprises a common electrode, and there is a voltage difference between the pixel electrode and the common electrode to drive the liquid crystals to deflect.

* * * * *